April 30, 1963  E. M. MOFFATT  3,087,381
PROJECTION APPARATUS FOR USE IN ARTICLE INSPECTION
Filed Dec. 10, 1958  4 Sheets-Sheet 2
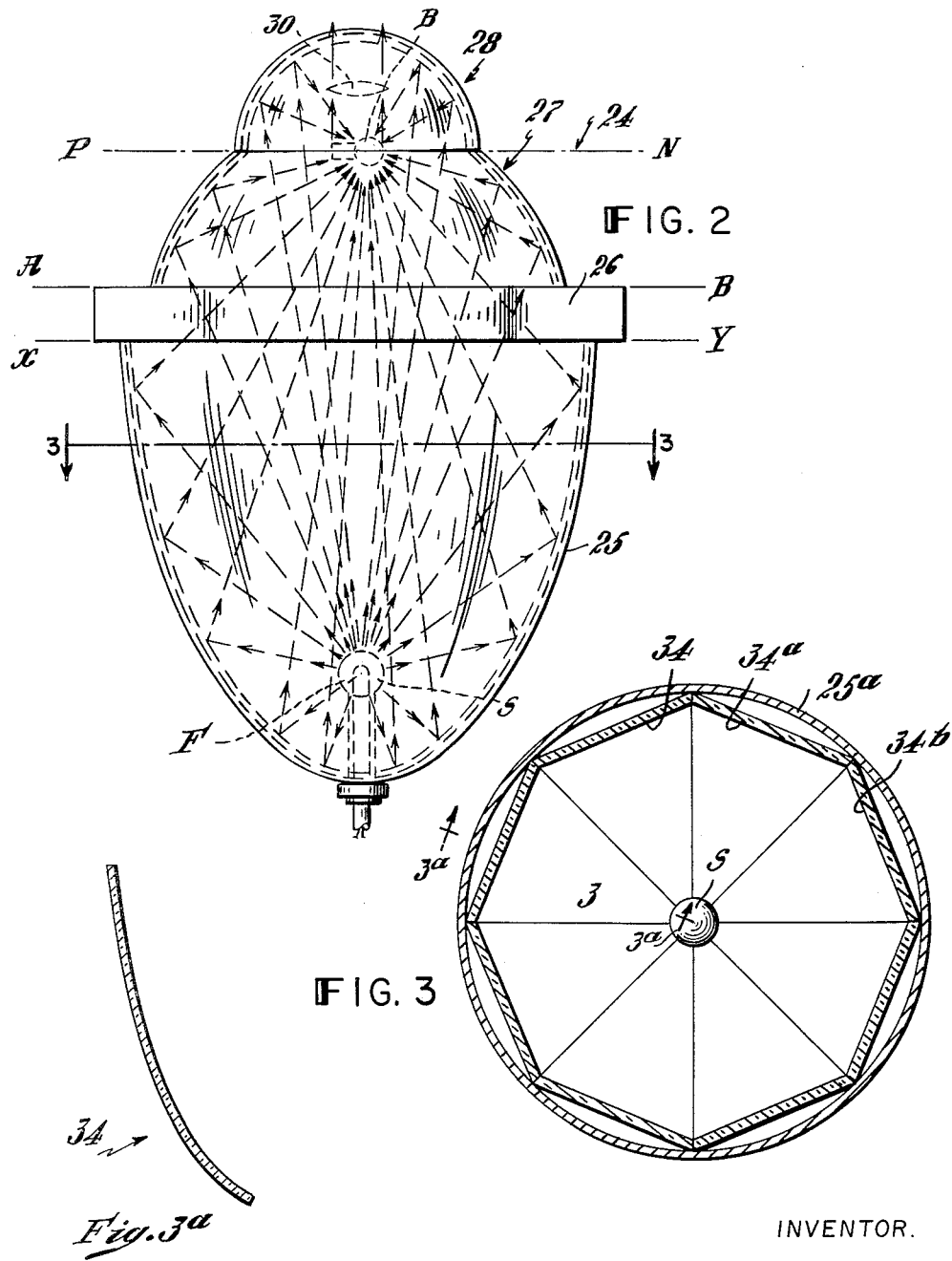
INVENTOR.
Elbert Marston Moffatt
BY Roberts Cushman & Grover
ATT'YS.

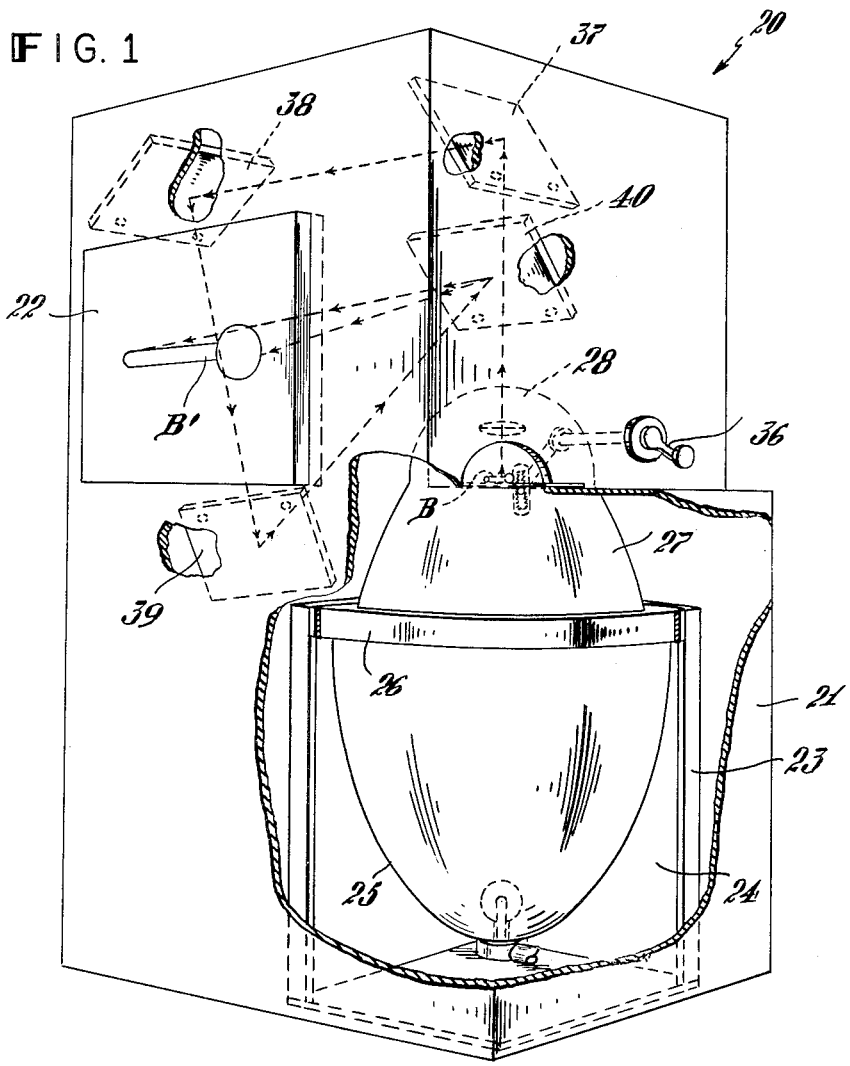

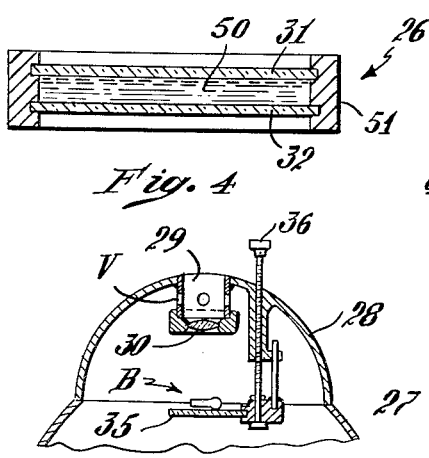
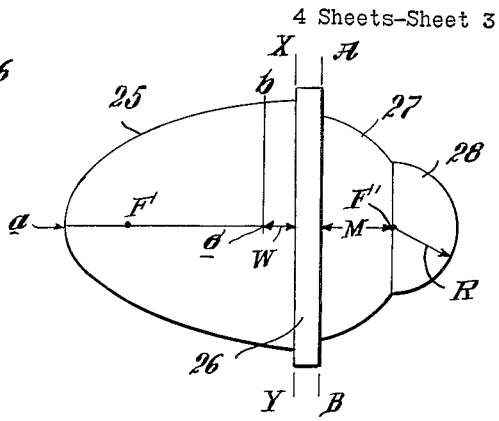
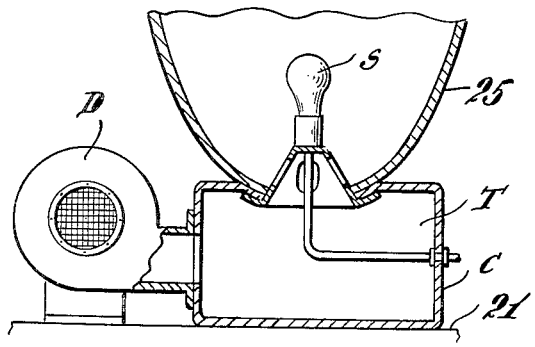
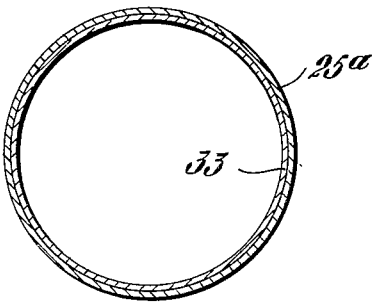

Inventor
Elbert Marston Moffatt

United States Patent Office 3,087,381
Patented Apr. 30, 1963

3,087,381
PROJECTION APPARATUS FOR USE IN
ARTICLE INSPECTION
Elbert Marston Moffatt, % Aerotech Specialties Inc.,
Glastonbury, Conn.
Filed Dec. 10, 1958, Ser. No. 779,436
3 Claims. (Cl. 88—24)

This invention pertains to projection apparatus, more especially to a machine for use in the visual inspection of small objects, for instance small machine parts, and in particular to improved means for illuminating the part to be inspected.

Apparatus of the above type commonly includes a screen of ground glass with provision for holding thereon a template having the exact shape of the object to be inspected, means for illuminating the object, and means for projecting an enlarged image of the object upon the screen in juxtaposition to the template, thus providing for ready comparison.

Since the image of a solid object must be projected by reflected light, intensive illumination is necessary particularly if the projected image is to be much enlarged; but, when a small object having a polished surface is the part to be illuminated, it is difficult to obtain a uniformly lighted image, the tendency being to produce an image which comprises a few high lights with the remainder of the image, by comparison, in dim outline. Moreover, the permissive quantity of light directed upon the object is limited because of the heating effect, so that it becomes a matter of much difficulty, in dealing with objects made of certain materials, to obtain the requisite brilliancy of reflection for the projection of the desired image without raising the temperature of the object to an injurious degree.

The present invention has for an object the provision of apparatus for use in projecting enlarged images of solid objects, including those having highly polished surfaces, such as to provide a sharp, clear and uniformly lighted image. A further object is to provide apparatus of the above type capable of producing an intensity of illumination such as to insure a clear and sharp image, even though much enlarged, without subjecting the object to an undue degree of temperature. A further object is to provide apparatus of the above type having provision for directing light of substantially uniform intensity from substantially all angles against the object thereby to insure uniformity in the light reflected and the avoidance of high lights in the image. A further object is to provide apparatus of the above type having provision for readily adjusting the object during inspection. A further object is to provide apparatus of the above type having provision for shielding the object being inspected from the heat rays eminating from the source of illumination without undue loss of brilliancy. A further object is to provide apparatus of the above type which is simple in structure, relatively cheap to manufacture and easy to manipulate. Other and further objects and advantages of the invention will be pointed out in the following more detailed description and by reference to the accompanying drawings wherein:

FIG. 1 is a perspective view of apparatus embodying the present invention with certain parts of the outer casing broken away to show interior parts;

FIG. 2 is a side elevation, to somewhat larger scale than FIG. 1, showing the reflector device including the heat-absorbing screen;

FIG. 3 is a horizontal section substantially on the line 3—3 of FIG. 2;

FIG. 3a is a vertical section of the line 3a—3a of FIG. 3;

FIG. 4 is a diametrical section illustrating one desirable form of heat-absorbing screen;

FIG. 5 is a diagram merely by way of illustration, but without limiting intent, showing certain relative portions of the parts constituting the reflector which have been found useful;

FIG. 6 is a fragmentary, diametrical section through the upper end of the projector device, illustrating desirable means for supporting the article whose image is to be projected;

FIG. 7 is a fragmentary, diametrical, vertical section through the lower part of the projector device;

FIG. 8 is a section similar to FIG. 3, but illustrating a modification; and

Figure 9:
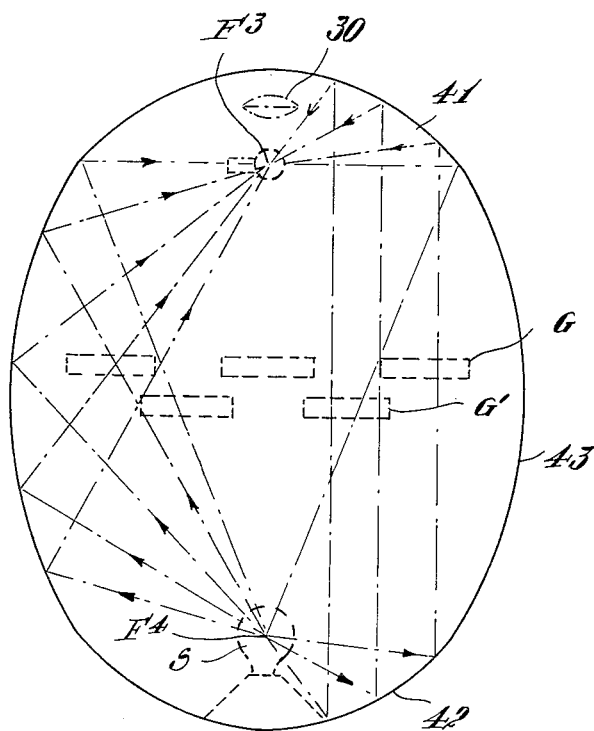
FIG. 9 is a view similar to FIG. 2, but showing a further modification.

For the ideal illumination of an object for projection purposes, the object should be located at the center of a hollow sphere having an uninterrupted reflecting surface, but this is not practicable because there must be a break somewhere in the spherical surface for the emergence of the image to be projected. Likewise, provision must be made for the entry of the conductors for current to the light source. In accordance with the present invention, a near approach to the ideal condition is made practicable by the location of the object at the center of a hemispherical reflector, said center also being at one focus of a semi-ellipsoidal reflector. Said center is also at one focus of a larger semi-ellipsoidal reflector at whose other focus the light source is located. By combining the hemispherical reflector with these semi-ellipsoidal reflectors whose major axes are aligned and whose larger ends are opposed, an aperture for the emergence of the image may be located at that pole of the hemispherical reflector which is on the major axis of the elliptical reflectors while still providing a uniformity of illumination of the objects as though it were at the center of a complete sphere. Moreover, this same arrangement permits a heat-absorbent screen to be interposed between the light source and the object without serious interference with the reflection of light from the reflecting surfaces onto the object.

While the reflectors should ideally be circular in all sections perpendicular to the longitudinal axes of the ellipsoidal reflectors, it is found that wholly acceptable results may be obtained, so far as the ellipsoidal reflectors are concerned, by the use of an assembly of independent mirrors, each of which, in a plane perpendicular to the major axis of the ellipsoidal reflector, is rectilinear. Such mirror surfaces may be made readily and cheaply, for instance, of polished sheet aluminum which is easily bent to the longitudinal curvature of the true ellipsoid, and by employing a suflicient number of such separate mirrors, for instance eight, forming a regular pentagon in a plane transverse to the major axis of the reflector, results closely approximating those which are obtainable by the use of reflecting means which is truly circular in transverse section are obtained.

Referring to FIG. 1 of the drawings, the numeral 20 designates the projection apparatus as a whole. This apparatus is herein disclosed, by way of example, as comprising a light-tight cabinet 21 of any suitable material, for example sheet metal, fibre board or the like and having in one of its vertical walls in opening which receives a translucent panel 22, for example a piece of ground glass.

In the lower part of the cabinet, there is arranged a frame 23 which supports the reflector device 24. This reflector device comprises a hollow casing which may be made of any suitable material, for example sheet metal and which, as here illustrated, comprises a lower portion 25 whose shape is that of a segment of a hollow ellipsoid of revolution having its major axis vertical. The casing of the reflector also comprises a cylindrical portion 26 which houses heat-filtering means; a second segment 27 of a hollow ellipsoid of revolution, somewhat smaller in dimensions than the segment 25, and a top portion or cab 28 which is a hollow hemisphere. The base (upper end) of the lower segment 25 is at the horizontal plane X—Y (FIG. 2) which also defines the lower end of the cylinder 26. The upper segment 27 has its lower base defined by the horizontal plane A—B (FIG. 2) which also defines the upper end of the cylinder 26; while the upper base plane P—N of the segment 27 also defines the base of the hemisphere 28. Referring to the diagram of FIG. 5, the character $F^1$ indicates the center of curvature of the hemisphere 28. This character $F^1$ also indicates the upper focus of both of the ellipsoidal segments 27 and 25. The lower focus of the segment 25 is indicated at F (FIGS. 2 and 5).

Referring to FIG. 5, wherein the reflector device is diagrammatically outlined and assuming $ao$ and $bo$ to be the semiaxes of the ellipsoidal segment 25, corresponding approximate proportional values for the dimensions W, M and R are given in the table forming a part of FIG. 5. These dimensional relationships are merely by way of example and are not intended as limitations.

The several segments (including the hemisphere 28) may, if desired, be of aluminum having their inner surfaces polished to provide the reflecting surface at the interior of the reflector device, or the several segments may be of other material as illustrated, for example in FIG. 8, wherein the segment $25^a$ is shown as having a special lining 33 of reflecting material.

The direction of light-rays from the source S of illumination and as reflected from the inner surface of the reflector are indicated by broken lines in FIG. 2.

While it is relatively simple to provide the hemispherical segment 28 with a reflecting inner surface, merely by polishing its interior, it is somewhat more expensive to provide such surfaces for the segments 25 and 27 and thus it is contemplated that the reflecting surfaces for the ellipsoidal segments may be made, as illustrated in FIGS. 3 and $3^a$. In FIG. 3, the outer shell $25^a$, for example of metal or a plastic, houses a plurality of separate mirrors 34, $34^a$, $34^b$ and so forth, each of which, in a plane perpendicular to the axis of the segment, is rectilinear. These parts 34, $34^a$, $34^b$, etc., for example, may be of aluminum, highly polished. They are arranged edge-to-edge and are of such dimensions as to form a regular octagon.

It is obvious, that, by the employment of a multitude of small plane mirrors, arranged edge-to-edge, and with their edges disposed in a geometrical surface which is a true ellipsoid of revolution, there would result a mirror which would, more and more, closely approximate, as a limit, a true ellipsoid of revolution as the number of mirrors increased and their sizes diminished.

Thus, herein when the reflecting device is referred to as a "hollow ellipsoid," it is to be understood that said expression is to be construed as inclusive of a reflecting device comprising a multitude of plane mirrors, or mirrors curved in one direction only, as well as a unitary surface which is a true surface of revolution.

As illustrated in FIG. $3^a$, each of these mirror members 34, $34^a$, etc. is bent longitudinally to conform in this direction to the true surface of the ellipsoid, the several mirror members converging at their lower ends but being shaped to leave an opening at the lower end of the segment for the passage of conductor wires leading current to the light source S, the latter being supported at the focal point F of the lower segment 25. Desirably, as illustrated in FIG. 7, the lower portion of the segment 25 rests upon a hollow supporting casing C into whose interior T a blower D delivers air under pressure. This air flows upwardly through an aperture at the bottom of the segment 25 so as to cool the light source S.

The hemisphere 28 is provided with an aperture 29 (FIG. 6) at its top, that is to say, at that pole of the spherical surface through which pass the major axes of the ellipsoidal segments 25 and 27. Within this opening, there is arranged a cylindrical casing V which supports the lens 30 by means of which the image of an object B, located at the point $F^1$, is projected outwardly from the reflector device into the interior of the cabinet 21. As illustrated, the wall of the casing V is provided with apertures through which air, forced into the projector casing by the blower, may escape into the space within the cabinet, the latter being provided with suitable ingress and outgress openings (not shown) for air.

The cylinder 26 which is interposed between the segments 25 and 27 constitutes a heat-absorbing or filtering device and, as here shown (FIG. 4), comprises two parallel, transparent, plate glass members 31 and 32 which, with a cylindrical wall 51, form a leak-tight chamber containing a body 50 of fluid of a heat-absorbing character, for example this body of fluid may be a one-inch layer of a saturated water solution of cuprous chloride. Such a solution absorbs nearly all of the infra-red rays, that is to say, approximately 85% of the total heat emitted by the light source S. By the provision of the blower for circulating air through the projector casing, the temperature may be kept within safe limits although employing a lamp of about 500 watts. The passage of air across the plane of the filter may be provided in any convenient way, for example, through vents provided in the cylindrical wall of cylinder 26.

For supporting the object B, whose image is to be projected, there may be provided a glass shelf 35, FIG. 6, supported for vertical movement in any desired way and which is adjusted up or down by any simple mechanism which is operated by a knob 36 (FIG. 1) at the outside of the cabinet.

By an arrangement of the reflecting surfaces such as above described, a very high percentage of the light from the source S is reflected to the object B, approaching it from substantially all angles. By using the two ellipsodal segments, it is possible to introduce the heat-absorbing device 26 at such a point that it does not substantially affect the continuity of the reflected light and with slight resultant sacrifice of total illumination. While in theory, all light eminating from a source at the focus F of the lower segment 25 should be reflected onto an object located at focus $F^1$, this theoretical result is not obtained because the segment 25 is less than a complete ellipsoid, but the hemispherical segment substantially compensates for this discrepancy, since any rays of light which miss the object on the first reflection will be reflected back to it by the hemispherical surface.

As above noted, the mirror members 34, $34^a$, etc. (which are here shown only in the lower segment, but which could also be employed in the upper segment 27) may be made of polished sheet aluminum which is easily bent to the shape illustrated in FIG. $3^a$. However, they may be of silvered glass, the bending of which in one direction only is not particularly difficult or, as above suggested, the casing of each of the several segments may be of a character such that it may itself receive a mirror polish at its inner surface, or have a coating of polished silver or the like.

Obviously, optimum results will only be obtained when the mirror surfaces closely approximate surfaces of revolution, and where practical it is contemplated that such surfaces will be produced by a spinning operation.

The image of the object which is projected outwardly in a vertical direction by the lens 30 through the opening 29 is received by a mirror 37 (FIG. 1) in the upper part of the cabinet. This mirror reflects the image onto another mirror 38 which, in turn, reflects the image downwardly to a mirror 39 and this again reflects the image onto a mirror 40 which is so inclined as to reflect the enlarged image $B^1$ of the object onto the vertical screen 22 where it readily may be compared with a template or other comparison element to show whether or not the object itself is of accurate shape and dimensions.

It is desirable that the mirror surfaces be "front silvered" mirrors such as those employed in reflex cameras so as to eliminate ghost images such as are caused by partial reflection from the glass surface of the ordinary mirror.

The arrangement of FIG. 2 produces excellent results when the object to be observed does not substantially exceed ¼ inch in diameter; but for larger objects, the arrangement of FIG. 9 is preferred. In this latter arrangement, the upper and lower end portions 41 and 42, respectively, of the reflector shell are segments of parabaliods of revolution, having their focii at $F^3$ and $F^4$, respectively, while the mid-portion of the shell is a central segment of an ellipsoid of revolution 43, whose focii coincide with the focal points $F^3$ and $F^4$. The object to be observed is supported at the focal point $F^3$, while the light source is at the focal point $F^4$. In other respects, the shell is of the same general construction as that shown in FIG. 3, insofar as the provision of means for supporting the object, the light source, the character of the mirror surfaces, and the means for ventilating are concerned. However, instead of the liquid type heat filter shown at 26 in FIG. 2, the arrangement of FIG. 9 provides for shielding the object from the intense heat of the light source by means of a plurality of parallel strips G and G' of heat-absorbent glass disposed in two layers with the strips of the upper layer staggered with respect to the strips of the lower layer. These layers of strips are preferably disposed at about the mid-horizontal plane of the shell, and the individual strips are sufficiently narrow to enable them to withstand the non-uniform heating to which they are subject. A single sheet of such glass would be subject to such intense heating at its central portion, as compared with its marginal portions, that it would very quickly shatter. Obviously, heat absorbing means like that of FIG. 9 may be substituted for the device 26 of FIG. 2.

The arrangement shown in FIG. 2 works well for objects less than ¼ inch in diameter, but because it concentrates the light in so small a spot, if the object be more than 1 inch in diameter, most of the light is reflected back by the body itself. Thus, the image of a highly polished object, such, for example, as a sphere, shows dark shadows. With the arrangement of FIG. 9, there is more lost illumination than is true of the arrangement of FIG. 2, but the blanketing effect of the object itself is less, the whole front surface of the object, to about 160° away from its center, being well illuminated.

With the above apparatus, the object may be magnified from 20 to 40 times, thus providing for very accurate and rapid inspection by comparing the enlarged image with the template which may be mounted upon the screen in any desired way.

While one desirable embodiment of the invention has herein been illustrated and described by way of example, it is to be understood that the invention is broadly inclusive of any and all modifications falling within the scope of the appended claims.

I claim:

1. In inspecting apparatus of the kind which includes a light-tight cabinet having an aperture in its wall in which is fitted a translucent screen, a reflector device operative to project an image of an object into the space within the cabinet, mirror means within the cabinet for reflecting said image onto the inner surface of the screen, said reflector device comprising a hollow casing having within it a support for the object whose image is to be projected onto the screen and a light source for illuminating the object, the casing having an aperture provided with a lens whereby an image of the object is projected outwardly from the casing onto said mirror means, the inner surface of said casing being light-reflecting, the casing comprising a mid-portion whose concave inner surface is that of the mid-segment of an ellipsoid of revolution whose ends are defined by parallel planes perpendicular to its major axis and passing through its respective foci, the opposite end portions of the casing having concave inner surfaces which are segments of parabaloids of revolution whose foci coincide with the respective foci of the ellipsoid, the object being supported at one of said foci and the light source being located at the other of said foci.

2. An inspecting apparatus, according to claim 1, having heat absorbing means interposed between the light source and the object.

3. Inspecting apparatus, according to claim 2, wherein the heat absorbing means comprises a plurality of layers, each of parallel strips of heat absorbent glass, each layer being in a plane substantially perpendicular to the axis of the ellipsoid of revolution and approximately midway between the foci of said ellipsoid, the strips which make up said layer being spaced apart from one another, and those of one layer being staggered relatively to those of the next layer so as to optically overlap with respect to said light source.

References Cited in the file of this patent

UNITED STATES PATENTS

| | | |
|---|---|---|
| 1,278,026 | Salto | Sept. 3, 1918 |
| 1,887,654 | Mahon | Nov. 15, 1932 |
| 1,927,854 | Straubel | Sept. 26, 1933 |
| 1,985,074 | Bauersfeld | Dec. 18, 1934 |
| 2,157,437 | Shipley | May 9, 1939 |
| 2,205,523 | Galey | June 25, 1940 |
| 2,265,992 | Beck | Dec. 16, 1941 |
| 2,332,668 | Richards | Oct. 26, 1943 |
| 2,496,675 | Pasquet | Feb. 7, 1950 |
| 2,851,922 | Rosin | Sept. 16, 1958 |